United States Patent [19]
Fukuda et al.

[11] 4,123,412
[45] Oct. 31, 1978

[54] URETHANE-BASE SEALING MATERIAL

[75] Inventors: Kiyou Fukuda, Yokohama; Toshihiko Kawabata; Kiyotsugu Asai, both of Tokyo, all of Japan

[73] Assignee: Mitsui-Nisso Corporation, Tokyo, Japan

[21] Appl. No.: 806,532

[22] Filed: Jun. 14, 1977

Related U.S. Application Data

[63] Continuation-in-part of Ser. No. 630,760, Nov. 11, 1975, abandoned, which is a continuation of Ser. No. 450,469, Mar. 12, 1974, abandoned.

[51] Int. Cl.$^2$ .............................................. C08K 5/20
[52] U.S. Cl. .................... 260/30.8 DS; 260/32.6 NR; 260/37 N
[58] Field of Search ...... 260/30.2, 30.8 DS, 32.6 NR, 260/37 N, 40 TN

[56] References Cited

U.S. PATENT DOCUMENTS

| | | | |
|---|---|---|---|
| 3,401,050 | 9/1968 | Scheibelhoffer | 260/37 N |
| 3,401,137 | 9/1968 | Finelli | 260/37 N |
| 3,446,771 | 5/1969 | Matsubayashi | 260/32.6 NR |
| 3,607,822 | 9/1971 | Nishino | 260/37 N |

OTHER PUBLICATIONS

A. Damusis, "Sealants," Reinhold Pub., New York, 1967, pp. 144, 145.

*Primary Examiner*—Paul R. Michl
*Attorney, Agent, or Firm*—Fisher, Christen & Sabol

[57] ABSTRACT

A thixotropic urethane-base sealing material comprising a base polymer selected from the group consisting of a urethane prepolymer and a mixture thereof with a polyol, prior to being hardened, colloidal silica or bentonite used as an anti-sag agent, and an additive used in synergistic combination with the anti-sag agent selected from the group consisting of a sulfoxide expressed by the formula $$R^1SOR^2$$

wherein $R^1$ and $R^2$ each represent lower alkyl, and an amide expressed by the formulas $$R^3CONR^4R^5$$

and

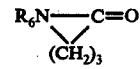

wherein $R^3$, $R^4$, $R^5$ and $R^6$ independently represent hydrogen or lower alkyl, whereby the thixotropic properties of the base polymer are remarkably improved, and a process for producing said material.

12 Claims, No Drawings

URETHANE-BASE SEALING MATERIAL

This application is a continuation-in-part of our application Ser. No. 630,760 filed Nov. 11, 1975, now abandoned, which application was a continuation of our application Ser. No. 450,469 filed Mar. 12, 1974 now abandoned.

BACKGROUND OF THE INVENTION

1. Field of the Invention

This invention relates to a thixotropic urethane-base sealing material and, more particularly, to a non-sag type urethane-base sealing material which comprises a urethane-base polymer mixed with an anti-sag agent and an additive of a particular nature so as to increase the thixotropic property of the base polymer and to improve its processing ability along with its anti-sag property.

2. Description of the Prior Art

In general, thixotropic urethane-base sealing materials are broadly classified into one-package types and two-package types: the former includes as base polymer a urethane prepolymer having at its ends isocyanate groups which can be cured or hardened after its application by means of moisture in the air; and the latter includes as base polymer a urethane prepolymer having isocyanate groups at its ends and is cured by the addition of a polyether polyol or the like. The sealing materials of both types are widely employed for architectural use, for civil engineering and for direct glazing in motor vehicle industries. For application to horizontal areas such as a floor, a sealing material is usually required to be of the so-called self-leveling type which flows easily to spread and makes a smooth surface. On the other hand, for application to vertical areas such as wall surfaces or window frames, a sealing material is required to be of the non-sag type which is substantially free from sagging or slumping after application. That is, the non-sag type sealing material should flow easily by external forces during its mixing and application. However, when it is at a standstill, the material should show no substantial flowability, i.e., exhibit a thixotropic property, due to its extremely increased apparent viscosity.

Non-sag type urethane-base sealing materials as known in the art generally include a urethane prepolymer or mixture thereof with a polyol as a base polymer and a plasticizer, adhesion improver, catalyst and pigment or the like, together with a filler such as talc, calcium carbonate, carbon black, diatomaceous earth, titanium dioxide or the like. The filler contributes not only to increase the weight of sealing material but also to control the hardness of cured material. However, a sealing material which is obtained by mixing a base polymer and said filler alone exhibits an extremely great sagging or slumping tendency during the application thereof, so that to obtain a non-sag type sealing material, it is common practice to use colloidal silica as an anti-sag agent. In this connection, it is the common experience that the greater the amount of the anti-sag agent used, the greater becomes the thixotropic tendency of the mixture with an extremely large increase in the apparent viscosity of the mixture, resulting in considerable reductions in mixing or other operational efficiencies. Furthermore, as the amount of this agent is increased, the more seriously deteriorated are the physical properties of the sealing material obtained after curing or hardening, i.e., hardness and modulus are undesirably increased, coupled with a substantial reduction in elongation and adhesion strength. For this reason, the use of a great amount of an anti-sag agent is not desirable. However, there have been known in the art few, if any, anti-sag agents which are useful for a urethane sealing material in only a small amount.

It is therefore a primary object of the present invention to provide a urethane base sealing material which is superior in both processing and non-sag properties.

It is another object of the present invention to provide a urethane base sealing material prior to being hardened which has desirable physical properties after curing.

It is a further object of the present invention to provide anti-sag agents and additives which are effective in small amounts and in combination to prevent a urethane base sealing material from sagging in use.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description. It has been found that the above objects can be attained by practicing the present invention.

An intensive and comprehensive study on the thixotropic effects of various compounds on urethane-base sealing materials has been conducted and there have been found compounds which exhibit substantially no anti-sag or anti-slump property when used along but which remarkably improve thixotropic and anti-sag properties of a sealing material when employed in combination with an anti-sag agent such as colloidal silica. The present invention is based upon this finding.

SUMMARY OF THE INVENTION

The thixotropic sealing material of the present invention which includes a urethane-base polymer, prior to being hardened, and an anti-sag agent is characterized by employing as an anti-sag additive at least one compound selected from the following groups (1) and (2) in synergistic combination with the anti-sag agent to improve the thixotropic property of the sealing material:

(1) a sulfoxide expressed by the formula

wherein $R^1$ and $R^2$ each represent lower alkyl; and (2) an amide expressed by formulas

and

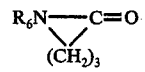

wherein $R^3$, $R^4$, $R^5$ and $R^6$ are independently hydrogen or lower alkyl.

Compounds of the anti-sag additives of group (1) include, for example, dimethylsulfoxide, diethylsulfoxide, di-n-butylsulfoxide and the like. The compounds of group (2) include, for example, formamide, dimethylformamide, acetamide, N-methylacetamide and N,N- dimethylacetamide, and α-pyrrolidone, N-methyl-α-pyroolidone, N-ethyl-α-pyrrolidone and the like. Some of these additives are known in the art as solvents for urethane polymers. However, they cause a considerable increase of apparent viscosity and thixotropic tendency of urethane polymers when added in a small amount in combination with an anti-sag agent.

The anti-sag agent or thixotropy-yielding agent useful for the purpose of the present invention is, for example, colloidal silica which is prepared by reacting silicone tetrachloride with steam at high temperature, bentonite or the like materials.

In the one-package type sealing material, the base polymer which is the main component of the urethane-base sealing material of the present invention may be a urethane prepolymer having isocyanate groups at its chain ends. The prepolymer can be prepared, for example, by the reaction of a polyisocyanate with a polyether polyol having an average molecular weight of 1,000 – 5,000 such as polyoxypropylenediol or triol, or with a polyol having an average molecular weight of 1,000 – 10,000 such as polyesterpolyol or caster oil. Examples of the polyisocyanate include tolylenediisocyanate, 4,4′-diphenylemthanediisocyanate and derivatives thereof. The isocyanates may be used singly or in combination.

In a sealing material using a urethane polymer of the one-package type, an isocyanate end group of the base polymer reacts with moisture in the air, which in turn reacts with other isocyanate end groups to form giant molecules or molecules having a network structure. A urethane-base sealing material which is characterized by its elasticity is formed mainly from such giant molecules. In the one-package type sealing material, the prepolymer itself should exhibit a non-sag characteristic, and it is necessary that the prepolymer contain both an anti-sag agent and an anti-sag additive.

On the other hand, a urethane-base sealing material of the two-package type may include as a base polymer a prepolymer of the same nature as used in the one-package type and having isocyanate end groups, and a polyol having hydroxyl end groups and having an average molecular weight of about 1,000 – 5,000. The amount of polyol used in the two-package type material is from 0.65 to 1.2 equivalents per equivalent part of urethane prepolymer. Examples of these polyols include polyoxypropylenediol, polyoxypropylenediol and their copolymers with ethylene oxide but other polyols such as polybutadienepolyol, vinylpolymer-grafted-polyetherpolyol and polyesterpolyol may be employed. When using the two-package type urethane sealing material, the prepolymer and polyol are mixed with each other immediately before application. Upon mixing, the end groups of both components react with each other to form a so-called urethane linkage and the mixture can be hardened irrespective of the existence or presence of moisture. In the two-package type sealing material, the prepolymer itself need not always exhibit a non-sag characteristic, but the mixture of the prepolymer and the polyol, prior to being hardened, must always be non-sag.

Thus, there are several embodiments of the present invention as follows:

1. Any polyol plus a prepolymer containing both an anti-sag agent and an anti-sag additive;
2. A polyol containing an anti-sag agent plus a prepolymer containing an anti-sag additive; and
3. A polyol containing an anti-sag additive plus a prepolymer containing an anti-sag agent.

Although the urethane-base sealing material of the present invention essentially comprises the base polymer, prior to being hardened, together with the anti-sag agent and the anti-sag additive described herein, other additives such as a plasticizer, an adhesion improver, a catalyst, a pigment, a filler and the like may be added to the material, if desired.

Examples of suitable plasticizers include dioctylphthalate, dibutylphthalate, dibutylsebacate, cumarone resin, and the like. Examples of adhesion improvers include β-(3,4-epoxy-cyclohexyl)ethyltrimethoxysilane, γ-glycidoxyproplytrimethoxysilane, γ-aminopropyltriethoxysilane, N-β-(aminoethyl)-γ-aminopropyltrimethoxysilane, and the like. Examples of suitable catalysts include dibutyltin dilaurate, lead 2-ethylhexoate, lead oleate, phenylmercury acetate, and the like. Examples of suitable pigments include inorganic pigments such as titanium oxide, chromium oxide and iron oxide, and organic pigments such as phthalocyanine.

Examples of suitable fillers include talc, calcium carbonate, diatomaceous earth, carbon black, kaolin, clay, titanium dioxide and the like. There are known a variety of fillers which differ from each other in composition, particle size and surface conditions. Some of the existing fillers provide a small amount of anti-sag tendency by themselves. However, it is generally necessary to incorporate an anti-sag agent into the sealing material even when a filler with such small anti-sag property is employed.

The anti-sag agent, the anti-sag additive, and other additives may be first premixed with the prepolymer or polyol, or they may be admixed with the prepolymer and/or polyol at the time of preparation of the ultimate sealing material. However, especially when the anti-sag additive contains active hydrogen or is used in the form of an aqueous solution, it is preferably mixed into the polyol or admixed with the other components immediately before use.

The amounts of the various components constituting the sealing material of the present invention generally may be widely varied depending upon the particular purpose of the application of the material. However, the anti-sag agent is generally used only in an amount of from 0.5 to 30 parts by weight per 100 parts by weight of the base polymer. It has also been found that when the anti-sag additive is used only in an amount of from 0.05 to 10 parts by weight per 100 parts by weight of the base polymer, the thixotropic property of the ultimate sealing material is remarkably improved. That is, the sealing material which comprises the base polymer and anti-sag agent together with a synergistic small amount, within the above range, of anti-sag additive is extremely high in apparent viscosity under static conditions, but decreases remarkably in apparent viscosity when a shear force is imposed, for example by agitation. Accordingly, there is provided a urethane-base sealing material which contains only a small amount of anti-sag agent and which permits easy agitation similar to that possible with ordinary dairy cream without presenting a sag or slump phenomenon.

If the amount of anti-sag agent is less than 0.5 parts by weight or the amount of anti-sag additive is less than 0.05 parts by weight, each per 100 parts by weight of the base polymer, the synergistic thixotropic property of the ultimate urethane-base sealing material is lost. On the other hand, if the amount of anti-sag agent used is more than 30 parts by weight per 100 parts by weight of the base polymer, rendering of the product uniform by mixing becomes difficult. Similarly, if the amount of anti-sag additive used is more than 10 parts by weight per 100 parts by weight of the base polymer, the viscosity of the ultimate sealing material decreases and the product again begins to sag. In addition, when the product is practically applied as a sealing material the excess anti-sag additive used will tend to ooze after application and the dimensional stability of the sealing material is decreased or is lost.

The present invention will be particularly illustrated in the following examples wherein the thixotropy of urethane-base materials was evaluated on the basis of the sag test as prescribed in ASA A-116.1 – 1967. In this connection, when the viscosity of the sealing materials to be tested was low enough to allow measurement by means of a rotary viscometer, the thixotropy was evaluated at 25° C. by the use of a Brookfield viscometer (i.e., VISMETRON produced by Tokyo Keisoku K.K.). With a rotary viscometer the rotational speed of the rotor corresponds to the sheer stress of the sealing material, so that a sealing material of higher thixotropic characteristics shows a greater degree of reduction in apparent viscosity when the rotational speed of the viscometer is increased to a predetermined level.

The following examples are illustrative only and should not be construed as limiting the present invention in any way whatsoever except as defined in the appended claims. In the examples, all parts are parts by weight unless otherwise defined.

EXAMPLE 1

100 parts by weight of a urethane prepolymer having an isocyanate content of 3.2% which was obtained by reacting 1.0 equivalent of polyoxypropylenetriol having an average molecular weight of 3,000 with 1.9 equivalents of tolylenediisocyanate (a 80/20 mixture of the 2,4- and 2,6-isomers) at 80° C for 3 hours were mixed uniformly with 2 parts by weight of colloidal silica (Aerosil 200 produced by Nippon Aerosil K.K.) and 0.5 part by weight of dimethylsulfoxide used as an anti-sag additive. The resultant mixture showed an excellent thixotropic property as well as an increased viscosity.

For comparative purpose, the same procedure was repeated without the dimethylsulfoxide as Example 1A. The mixture obtained showed no thixotropic tendency. The test results are shown in the following Table 1.

Table 1

| Example | Anti-Sag Additive Name | Amount* | Apparent Viscosity ($10^3$CPS) Rotation Speed (r.p.m.) | | |
|---|---|---|---|---|---|
| | | | 1.5 | 3 | 6 |
| 1 | Dimethyl-sulfoxide | 0.5 | 153 | 104 | 74 |
| 1A | — | — | 24 | 23 | 24 |

*Parts per 100 parts by weight of urethane prepolymer

EXAMPLE 2

100 parts by weight of polyoxypropylenediol having a molecular weight of 2,000 were mixed uniformly with 4 parts by weight of colloidal silica (Aerosil 200) and 0.6 parts by weight of dimethylsulfoxide which was used as an anti-sag additive. The resultant mixture was designated as System A and exhibited an excellent thixotropic tendency as well as increased viscosity.

For comparative purpose, the above procedure was repeated without dimethylsulfoxide as Example 2A. The resultant mixture designated System A' showed substantially no thixotropic tendency. The test results are shown in the following Table 2.

Table 2

| Example | Anti-Sag Additive Name | Amount* | Apparent Viscosity ($10^3$ CPS) Rotation Speed (r.p.m.) | | |
|---|---|---|---|---|---|
| | | | 6 | 12 | 30 |
| 2 | Dimethyl-sulfoxide | 0.6 | 36.3 | 21.1 | 10.9 |
| 2A | — | — | 1.2 | 1.1 | 1.0 |

*Parts per 100 parts by weight of polyoxypropylenediol.

EXAMPLE 3

System A of Example 2 was reacted with a urethane prepolymer having isocyanate end groups to form a polyurethane composition. An equi-molar mixture of 3000 average M.W. polyoxypropylene-diol and 3000 average M.W. polyoxypropylene-triol was reacted with 2.0 equivalents of tolylene diisocyanate (80/20 mixture of the 2.4/2.6 isomers) at 80° C for 3 hrs. 100 parts of the prepolymer thus obtained, having an isocyanate content of 3.1%, were mixed thoroughly with 7 parts by weight of colloidal silica (Aerosil 200). The resultant prepolymer mixture was designated as System B. 145 parts by weight of System B (1.07 equivalents) were uniformly mixed with 104.6 parts by weight of System A (1.0 equivalent). The mixture obtained was then subjected to the sag test conducted by the use of a stainless steel frame as prescribed in ASA A 116.1-1967 for a relatively short period of time at room temperature to compare the thixotropic tendency. The mixture was very low in sag with excellent thixotropic tendency.

For comparative purpose, 104 parts by weight of System A' of Example 2A were uniformly mixed with 145 parts by weight of System B as Example 3A and the resultant mixture was subjected to the same sag test as defined above. This mixture showed a very high sag as illustrated in Table 3.

Table 3

| Example | Sag (mm) | |
|---|---|---|
| | 25 min. | 4 hours |
| 3 | 1.0 | 2.0 |
| 3A | 20 | 50 (2 hours) |

EXAMPLE 4

System A" was prepared following the same procedure as that of Example 2 except that 0.6 parts by weight of dimethylformamide was used instead of dimethylsulfoxide. Then, 104.6 parts by weight of System A" (1.0 equivalent) were uniformly mixed with 145 parts by weight of System B of Example 3 (1.07 equivalents) for conducting the sag test. The test results are shown in Table 4 below. It is clear from the table that this example illustrates a material having an excellent anti-sag property.

Table 4

| Example | Sag (mm) | |
|---|---|---|
| | 25 min. | 4 hours |
| 4 | 3 | 6 |
| 3A | 20 | 50 (2 hours) |

EXAMPLE 5

97 parts by weight of polyoxypropylenediol having an average molecular weight of 3,000, 40 parts by weight of dioctylphthalate, 20 parts by weight of titanium dioxide (a rutile type, R-820, produced by Ishihara Sangyo K.K.), 30 parts by weight of heavy calcium carbonate (produced by Tsuchiya Kaolin K.K.), 13 parts by weight of colloidal silica (Aerosil 200) and 4 parts by weight of dimethylsulfoxide were mixed thoroughly to produce System C. 204 parts by weight of System C (1.0 equivalent) were then mixed with 100 parts by weight of a prepolymer containing 2.9% isocyanate (1.07 equivalent) which was obtained by reacting 1.0 equivalent of a 30:70 molar mixture of polyoxypropylenetriol having an average molecular weight of 3,000 and polyoxypropylenediol having an average molecular weight of 2,000 with 1.8 equivalents of tolylenediisocyanate (2,4-/2,6-isomer = 80/20) at 80%C for 3 hrs. The resultant mixture was subjected to the sag test. It was found that the system of this example had a great thixotropic tendency, exhibiting a composition of the non-sag type.

For comparative purpose, System C' was prepared in the same manner as described above but omitting the dimethylsulfoxide. 200 parts by weight of System C' was mixed with 100 parts by weight of the above-described prepolymer as Example 5A and the resultant mixture was subjected to the sag test and showed substantially no thixotropic tendency.

The test results are shown in Table 5 below.

Table 5

| Example | Sag (mm) 24 hours |
|---|---|
| 5 | 0 |
| 5A | Sagging |

EXAMPLE 6

System D was prepared in the same manner as System C was prepared in Example 5 except that 4 parts by weight of dimethylformamide was used instead of the dimethylsulfoxide. 204 parts by weight of the resultant System were mixed with 100 parts by weight of the prepolymer of Example 5 for conducting the sag test. The sag after 24 hrs. was 1.8 mm, which was superior in thixotropic tendency to that of Example 5A.

EXAMPLE 7

Example 5 was repeated for the preparation of another mixed system except that 4 parts by weight of dimethylacetamide was used instead of the dimethylsulfoxide. 204 parts by weight of this system were mixed with 100 parts by weight of the prepolymer of Example 5 for conducting the sag test. As a result, the sag after 24 hrs. was 2.0 mm, which was considered excellent in comparison with that of Example 5A.

EXAMPLE 8

Example 5 was repeated for the preparation of still another mixed system except that 4 parts by weight of formamide was used instead of the dimethylsulfoxide. 204 parts by weight of this system were then admixed with 100 parts by weight of the prepolymer of Example 5 for conducting the sag test. As a result, the sag after 24 hrs. was 6 mm, which was considered excellent in thixotropic tendency in comparison with that of Example 5A.

EXAMPLE 9

Example 5 was again repeated for the preparation of another mixed system except that 4 parts by weight of N-methyl-2-pyrrolidone was used instead of the dimethylsulfoxide. 204 parts by weight of this system were admixed with 100 parts by weight of the prepolymer of Example 5 for conducting the sag test. As a result, the sag after 24 hrs. was 1 mm, which was considered excellent in thixotropic tendency in comparison with that of Example 5A.

EXAMPLE 10

Example 5 was repeated for the preparation of another mixed system except that 4 parts by weight of N,N-diethylacetamide was used instead of the dimethylsulfoxide. 204 parts by weight of this system was admixed with 100 parts by weight of the prepolymer of Example 5 for conducting the sag test. The sag after 4 hrs. was 50 mm, which was considered excellent in thixotropic tendency in comparison with that of Example 5A wherein the tested mixture sagged immediately after commencement of the test.

The following examples illustrate the synergism of the combination of anti-sag agent and anti-sag additive of the present invention.

EXAMPLE 11

A urethane prepolymer having an isocyanate content of 3.2% was obtained by reacting 1.0 equivalent of polyoxypropylenetriol having an average molecular weight of 3,000 with 1.9 equivalents of tolylenediisocyanate (an 80/20 mixture of the 2,4- and 2,6-isomers) at 80° C for 3 hrs. The resultant urethane prepolymer was designated as System D. 100 parts by weight of the urethane prepolymer were mixed uniformly with 5 parts by weight of colloidal silica (Aerosil 200 produced by Nippon Aerosil K.K.) and 2 parts by weight of dimethylsulfoxide. The resultant mixture was designated as System A. The above procedure was repeated in one case without dimethylsulfoxide and in another case without colloidal silica. The former mixture was designated as System B and the latter mixture was designated as System C. The thixotropy of these systems was evaluated on the basis of a sag test, and by the use of two types of Brookfield Viscometers (B8M type VISMETRON for low viscosity systems and B8H type VISMETRON for high viscosity systems produced by Tokyo Keisoku K.K.). The test results were shown in Table 6 and Table 7 below.

Table 6

| System | Apparent Viscosity ($10^3$ CPS)* Rotation Speed (r.p.m.) | | | | | | Sag (mm) at 5 min. |
|---|---|---|---|---|---|---|---|
| | 0.3 | 0.6 | 1.5 | 3 | 6 | 12 | |
| A | >2000 | — | — | — | — | — | 0 |
| B | 30.0 | 27.0 | 28.0 | 29.6 | — | — | >50 |
| C | 6.4 | 7.2 | 7.2 | 7.7 | 7.6 | 7.7 | Ran out immediately and sag could not be measured. |
| D | 9.2 | 9.0 | 9.1 | 9.2 | 9.2 | 9.3 | |

*B8M type viscometer was used.

Table 7

| System | Apparent Viscosity($10^3$ CPS)* Rotation Speed (r.p.m.) | | | | | | | |
|---|---|---|---|---|---|---|---|---|
| | 0.5 | 1.0 | 2.5 | 5 | 10 | 20 | 50 | 100 |
| A | 2900 | 1500 | 664 | 376 | 224 | 136 | 76 | 68 |

EXAMPLE 12

A polyoxypropylenediol having a molecular weight of 3,000 was designated as System H. 100 parts by weight of the polyoxypropylenediol was mixed uniformly with 8 parts by weight of colloidal silica (Aerosil 200) and 2 parts by weight of dimethylsulfoxide. The resultant mixture was designated as System E. The above procedure was repeated in one case without dimethylsulfoxide and in another case without colloidal silica. The former mixture was designated as System F and the latter mixture was designated as System G. The test results are shown in Table 8 and Table 9 below.

Table 8

| System | Apparent Viscosity(10³ CPS)* Rotation Speed(r.p.m.) | | | | | | | Sag (mm) at 5 min. |
|---|---|---|---|---|---|---|---|---|
| | 0.3 | 0.6 | 1.5 | 3 | 6 | 12 | 30 | 60 | |
| E | >2000 | — | — | — | — | — | — | — | 0 |
| F | — | 2.2 | 2.4 | 2.3 | 2.2 | 2.2 | 2.4 | — | Run out immediately and sag could not be measured. |
| G | — | — | — | 0.6 | 0.6 | 0.6 | 0.6 | 0.6 | |
| H | — | — | — | 0.6 | 0.6 | 0.6 | 0.6 | 0.6 | |

*B8M type viscometer was used.

Table 9

| System | Apparent Viscosity (10³ CPS)* Rotation Speed (r.p.m.) | | |
|---|---|---|---|
| | 0.5 | 1.0 | 2.5 |
| E | 5800 | 3400 | >1600 |

*B8H type viscometer was used.

EXAMPLE 13

107 parts by weight of System A of Example 11 (1.05 equivalents) was uniformly mixed with 98 parts by weight of System E of Example 12 (1.00 equivalent). The mixture obtained was designated as System I, and the system was subjected immediately to a sag test. Similarly, combinations of mixtures as shown in Table 10 were produced, wherein 1.05 equivalents of each urethane prepolymer system was mixed with 1.00 equivalent of each polyol system. The resultant mixture systems were subjected immediately to a sag test or to an apparent viscosity measurement. The test results are shown in Table 11.

Table 10

| | Urethane prepolymer | | Polyol | |
|---|---|---|---|---|
| System | System | Parts by weight | System | Parts by weight |
| I | A | 107 | E | 98 |
| J | A | 107 | F | 96 |
| K | A | 107 | G | 91 |
| L | A | 107 | H | 89 |
| M | B | 105 | E | 98 |
| N | B | 105 | G | 91 |
| P | B | 105 | H | 89 |
| Q | C | 102 | E | 98 |
| R | C | 102 | F | 96 |
| S | C | 102 | G | 91 |
| T | C | 102 | H | 89 |
| U | D | 100 | F | 96 |
| V | D | 100 | G | 91 |
| W | D | 100 | H | 89 |

Table 11

| System | Apparent Viscosity (10³ CPS)* Rotation Speed (r.p.m.) | | | | | | | | Sag (mm) at | | |
|---|---|---|---|---|---|---|---|---|---|---|---|
| | 0.5 | 1 | 2.5 | 5 | 10 | 20 | 50 | 100 | 5 min | 10 min | 60 min |
| I | | | | | | | | | 0 | 0 | 0 |
| J | | | | | | | | | 0 | 0 | 0 |
| K | 504 | 272 | 130 | 77 | 47 | 30 | 17 | 12 | 29 | >50 | |
| L | | | | | | | | | 40 | >50 | |
| M | | | | | | | | | 0 | 0 | 0 |
| N | 432 | 240 | 117 | 68 | 41 | 26 | 16 | 11 | 35 | >50 | |
| P | | | | | | | | | Ran out immediately and sag could not be measured | | |
| Q | | | | | | | | | 0 | 0 | 0 |
| R | | | | | | | | | 0 | 0 | 0 |
| S | | | | | 2.8 | 2.8 | 2.5 | 2.5 | | | |
| T | | | | | | | | | | | |
| U | 144 | 91 | 49 | 32 | 22 | 16 | 10.5 | 8.3 | Ran out immediately and sag could not be measured | | |
| V | | | | | | | | | | | |
| W | | | | | 3.5 | 3.3 | 3.0 | 3.0 | | | |

*B8H type viscometer was used.

EXAMPLE 14

2 Parts by weight of each of acetate, methylethylketone, dioxane and toluene were used instead of the 2 parts by weight of dimethylsulfoxide in System A of Example 11 and the resultant mixtures were designated as Systems a, b, c and d, respectively. The resultant mixture systems were subjected to an apparent viscosity measurement. The test results are shown in Table 12.

Table 12

| System | Apparent Viscosity (10³ CPS)* Rotation Speed (r.p.m.) | | | | | | |
|---|---|---|---|---|---|---|---|
| | 0.3 | 0.6 | 1.5 | 3 | 6 | 12 | 30 |
| a | — | 20.0 | 18.0 | 19.0 | 19.5 | 20.0 | 19.0 |
| b | — | 22.5 | 19.0 | 18.0 | 19.5 | 20.5 | 20.0 |
| c | — | 28.0 | 26.0 | 24.0 | 23.5 | 24.0 | — |
| d | — | 19.0 | 18.0 | 19.0 | 18.8 | 20.0 | 20.5 |
| B | 30.0 | 27.0 | 28.0 | 29.6 | — | — | — |
| D | 9.2 | 9.0 | 9.1 | 9.2 | 9.2 | 9.3 | — |
| A | >2000 | — | — | — | — | — | — |

*B8M type viscometer was used.

EXAMPLE 15

20 Parts by weight of dimethylsulfoxide was used instead of the 2 parts by weight of dimethylsulfoxide in System A of Example 11 and the resultant mixture was designated as System e. The resultant mixture system was subjected to a sag test. The test results are shown in Table 13.

Table 13

| System | Slump(mm) at 5 min. |
|---|---|
| e | >50 |
| A | 0 |

What is claimed is:
1. A thixotropic urethane-base sealing material comprising:
(1) a base polymer selected from the group consisting of a urethane prepolymer having isocyanate end groups and a mixture thereof with a polyol having hydroxyl end groups, prior to being hardened;

(2) from 0.5 to 30 parts by weight per 100 parts of base polymer of an anti-sag agent selected from the group consisting of colloidal silica and bentonite; and (3) from 0.05 to 10 parts by weight per 100 parts by weight of said base polymer of an anti-sag additive selected from the group consisting of a sulfoxide expressed by the formula $R^1SOR^2$ wherein $R^1$ and $R^2$ each represent lower alkyl, and an amide expressed by the formulas $R^3CONR^4R^5$ and $$R^6N\underset{(CH_2)_x}{\overset{\diagdown\diagup}{\rule{0pt}{1ex}}}C=O$$

wherein $R^3$, $R^4$, $R^5$ and $R^6$ are independently hydrogen or lower alkyl.

2. The urethane-base sealing material according to claim 1 wherein said sulfoxide is selected from the group consisting of dimethylsulfoxide, diethylsulfoxide, and di-n-butylsulfoxide.

3. The urethane-base sealing material according to claim 1 wherein said amide is selected from the group consisting of formamide, dimethylformamide, acetamide, N-methylacetamide, N-dimethylacetamide, α-pyrrolidone, N-methyl-α-pyrrolidone, and N-ethyl-α-pyrrolidone.

4. The urethane-base sealing material according to claim 1 wherein said base polymer is a urethane prepolymer having isocyanate end groups.

5. The urethane-base sealing material according to claim 1 wherein said base polymer is a mixture of a urethane prepolymer and a polyol having hydroxyl end groups.

6. A method for producing a thixotropic urethane-base sealing material which comprises mixing together:
   (1) a base polymer selected from the group consisting of a urethane prepolymer having isocyanate end groups and a mixture thereof with a polyol having hydroxyl end groups, prior to being hardened;
   (2) from 0.5 to 30 parts by weight per 100 parts of base polymer of an anti-sag agent selected from the group consisting of colloidal silica and bentonite; and
   (3) from 0.05 to 10 parts by weight per 100 parts by weight of said base polymer of an anti-sag additive selected from the group consisting of a sulfoxide expressed by the formula $R^1SOR^2$ wherein $R^1$ and $R^2$ each represent lower alkyl, and an amide expressed by the formulas $R^3CONR^4R^5$ and $$R^6N\underset{(CH_2)_x}{\overset{\diagdown\diagup}{\rule{0pt}{1ex}}}C=O$$

wherein $R^3$, $R^4$, $R^5$ and $R^6$ are independently hydrogen or lower alkyl.

7. A thixotropic urethane-base sealing material consisting essentially of
   (1) a base polymer which is a urethane prepolymer having isocyanate end groups, prior to being hardened;
   (2) from 0.5 to 30 parts by weight per 100 parts of base polymer of an anti-sag agent selected from the group consisting of colloidal silica and bentonite; and
   (3) from 0.05 to 10 parts by weight per 100 parts by weight of said base polymer of an anti-sag additive selected from the group consisting of a sulfoxide expressed by the formula $R^1SOR^2$ wherein $R^1$ and $R^2$ each represent lower alkyl, and an amide expressed by the formulas $R^3CONR^4R^5$ and $$R^6N\underset{(CH_2)_x}{\overset{\diagdown\diagup}{\rule{0pt}{1ex}}}C=O$$

wherein $R^3$, $R^4$, $R^5$ and $R^6$ are independently hydrogen or lower alkyl.

8. The urethane-base sealing material according to claim 7 wherein said base polymer further includes polyoxypropylenediol.

9. The urethane-base sealing material according to claim 7 wherein said base polymer further includes polyoxypropylenetriol.

10. The urethane-base sealing material according to claim 7 wherein said base polymer further includes polybutadienepolyol.

11. The urethane-base sealing material according to claim 7 further including an additive selected from the group consisting of a plasticizer, an adhesion improver, a catalyst, a pigment, and a filler.

12. The urethane-base sealing material according to claim 11 wherein said base polymer further includes a polyol having hydroxyl end groups selected from the group consisting of polyoxypropylenediol, polyoxypropylenetriol and polybutadienepolyol.

* * * * *